June 16, 1931.    F. WANDER, JR    1,810,584
ADJUSTABLE ROTOR FOR AEROPLANES AND HELICOPTER ROTORS
Filed Jan. 7, 1931
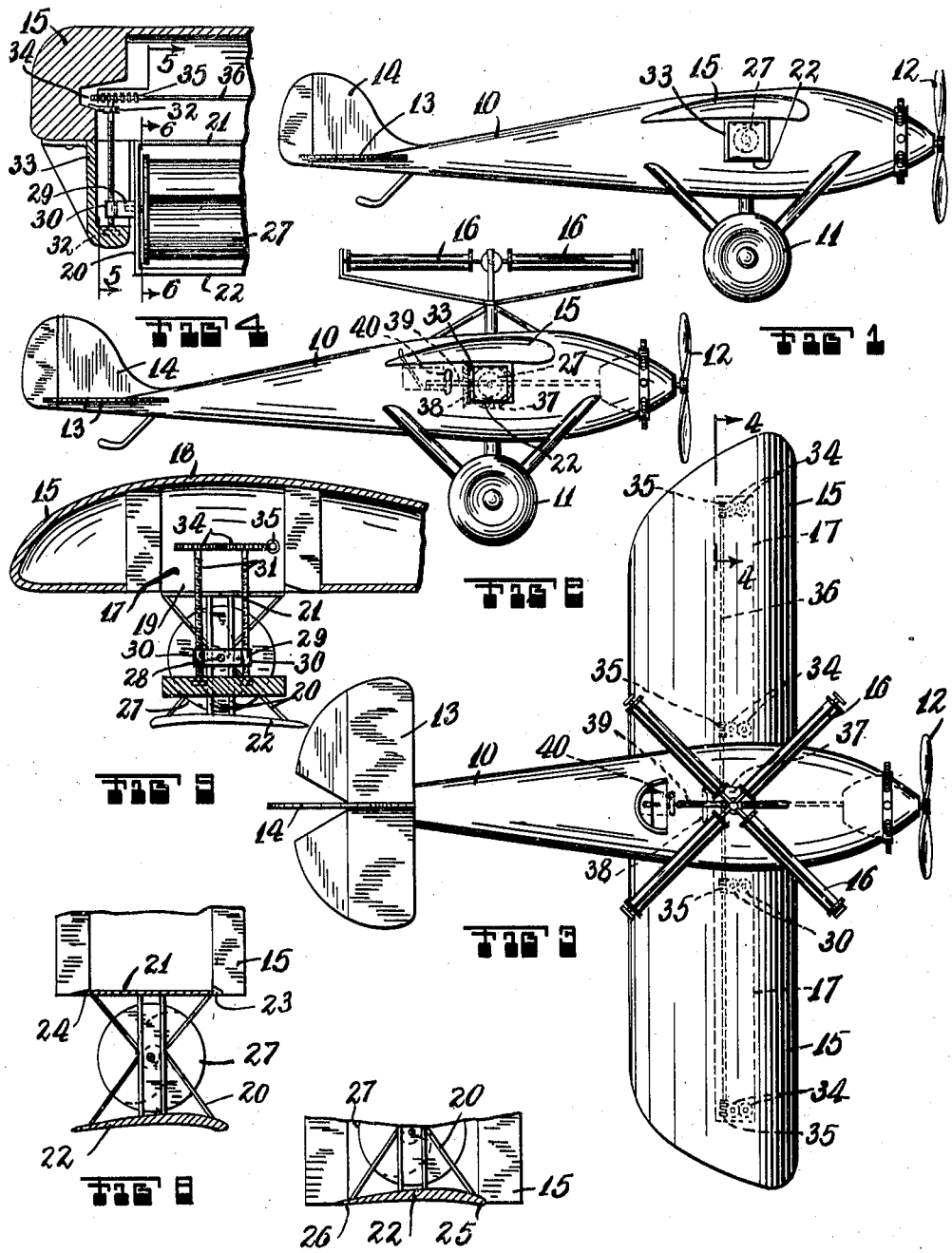
INVENTOR
*Frederick Wander Jr.*
BY
*[signature]*
ATTORNEY Patented June 16, 1931

1,810,584

UNITED STATES PATENT OFFICE

FREDERICK WANDER, JR., OF NEW YORK, N. Y.

ADJUSTABLE ROTOR FOR AEROPLANES AND HELICOPTER ROTORS

Application filed January 7, 1931. Serial No. 507,049.

This invention relates to new and useful improvements in an adjustable rotor for aeroplanes, and helicopter rotors.

The invention has for an object to provide an adjustable rotor for aeroplanes characterized by a helicopter rotor mounted within the wing or wings of an aeroplane and to provide an adjustment to move the rotor from within to various positions outside.

The invention has for a still further object to form the wing with a chamber which is closed at the top and opened at the bottom and to arrange the helicopter rotor within the chamber.

A still further object of the invention is to support small wings above and below the helicopter rotor so as to close the bottom of said chamber or to partially close the chamber when the rotor is extended for changing the flying qualities of the machine.

It is a still further object of this invention to provide screws at the end of the chamber, a means operated by said screws for supporting said rotor, and means for unitarily controlling the screws to uniformly project the rotor.

It is a still further object of this invention to construct a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of an aeroplane with an adjustable rotor constructed according to this invention.

Fig. 2 is a side elevational view of an aeroplane similar to the one illustrated in Fig. 1, but also including a helicopter.

Fig. 3 is a plan view of Fig. 2.

Fig. 4 is a fragmentary sectional view taken on the line 4—4 of Fig. 3.

Fig. 5 is a transverse sectional view taken on the line 5—5 of Fig. 4.

Fig. 6 is a sectional view taken on the line 6—6 of Fig. 4.

Fig. 7 is a view similar to Fig. 6, but showing the helicopter rotor in the retracted position.

In Fig. 1 an aeroplane 10 has been illustrated which may be of any conventional design and construction, and is shown to include a landing gear 11, a propeller 12, an elevator 13, tail wing 14 and side main wings 15. In Figs. 2 and 3 the aeroplane is shown constructed similarly, except that it is also provided with a helicopter 16. This helicopter is shown in the form of a large propeller having four rotors. These rotors may be free, or a means may be provided for rotating them. A suitable driving means, preferably connected with the engine of the aeroplane, should connect the helicopter for its rotation.

In both of the aeroplanes illustrated in Figs. 1 and 2, the main wings 15 are shown provided with a chamber 17 which is closed at the top 18 and opened at the bottom 19. This chamber extends from end to end of the wing, as may be seen from inspecting Fig. 3. Preferably, the chamber should be parallel to the front and rear edges of the wings.

A frame structure 20 is provided with an upper wing 21 and with a lower wing 22. This frame structure consists of a plurality of bars and braces arranged at both ends of each chamber. The top wing 21 is of a size so that when the frame 20 is fully extended from the bottom of the wing, it serves to close the chamber 17 as illustrated in Fig. 6. The front and rear edges of the chamber are cut-out, as indicated by reference numerals 23 and 24, to fit the front and rear edges 25 and 26 respectively of the bottom wing. When the frames are in their retracted positions, the bottom wing 22 closes the bottom of the chamber as clearly shown in Fig. 7.

A helicopter rotor 27 is arranged between the upper and lower wings 21 and 22 respectively and is rotatively supported upon the frames 20. The helicopter rotor is shown free to rotate, but if it is so wanted a means may be provided for driving it. At each end the rotor 27 is provided with a trunnion 28 which engages into transverse end member 29 forming a bearing for the trunnions.

A means is provided for holding the frames 20 in various adjusted positions so that the lower wing may close the bottom of said chamber, or so that the upper wing closes the bottom, or so that the rotor 27 is in any extended position within the chamber. This means comprises a pair of vertical socket elements 30 at the ends of each of the transverse members 29. A pair of vertical parallel screws 31 threadedly engage through the socket members 30 and are rotatively supported in bearings 32 permanently attached upon the wing 15 and upon extensions 33 projecting from the bottom of the wing.

Gears 34 are fixed upon the screws 31. The gears 34 upon the pair of screws at each end of the chamber mesh with each other. A worm 35 meshes with one of each of the pairs of gears 34 and these worms are fixed upon a transverse shaft 36 extending completely from the outer tip of one wing through the entire machine to substantially the outer tip of the other wing. A bevel gear 37 is fixed upon the shaft 36 and meshes with another bevel gear 38 upon a shaft 39 provided with a hand wheel 40 in the vicinity of the pilot of the machine so that manual adjustments may be made to cause the shaft 36 to turn, which rotation will be transmitted to turn the screws 31 and raise or lower the frames 20 which carry the helicopter rotors 27.

In Figs. 1 2, 4, 5 and 6, the helicopter rotors have been shown in fully extended positions. An aeroplane in flight in this condition has substantial lifting qualities which is very desirable in taking off and in landing. During flight, it is best that the helicopter rotors 27 be retracted, as illustrated in Fig. 7, and this will reduce the head-on resistance of the plane so that greater speed is possible. If the pilot so desires, the helicopters 27 may be adjusted to various extended positions so that component actions are obtained.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber.

2. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, the chamber for said wing extending substantially from one end to the other and being parallel to the front and rear edges.

3. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, said upper wing being of a size to snugly fit within the chamber so as to close the chamber when the frame is in the lowered position.

4. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, said lower wing being of a size so as to close the bottom of the chamber when the frame is in the raised position with the helicopter within the chamber.

5. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, comprising screws rotatively supported on the ends of the chamber, the transverse member threadedly engaged on the screws, and trunnions from said rotor engaging in said transverse member.

6. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, comprising screws rotatively supported on the ends of the chamber, the transverse member threadedly engaged on the screws, and trunnions from said rotor engaging in said transverse member, and a means for manually turning said screws including gears on adjacent screws meshing with each other, worms engaging certain of said screws and on a shaft connected with means for manual turning.

7. An adjustable rotor for aeroplanes, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, screws rotatively mounted and threadedly engaging transverse members rotatively supporting said rotor, and means for manually turning said screws to adjust the positions of said frame.

8. An adjustable rotor for aeroplanes and helicopter rotors, comprising an aeroplane wing formed with a chamber opened at the bottom, a frame with an upper and a lower wing within said chamber, a rotor between said upper and lower wings, and means for holding said frame in various adjusted positions so that the lower wing closes the bottom of said chamber or so that the upper wing closes the bottom of said chamber or so that the rotor is in any extended position out of said chamber, said helicopter rotors comprising a plurality of radially arranged rotors, rotatable individually around their own axes and simultaneously in a plain substantially parallel to the said wings.

In testimony whereof I have affixed my signature.

FREDERICK WANDER, Jr.